United States Patent
Makela et al.

(10) Patent No.: US 7,157,134 B2
(45) Date of Patent: Jan. 2, 2007

(54) LAYERED STRUCTURE, SENSOR AND METHOD OF PRODUCING AND USE OF THE SAME

(75) Inventors: Tapio Makela, Helsinki (FI); Salme Jussila, Espoo (FI); Mikko Pietila, Helsinki (FI); Raimo Korhonen, Tampere (FI)

(73) Assignee: Metso Corporation, Helsinki (FI)

( * ) Notice: Subject to any disclaimer, the term of this patent is extended or adjusted under 35 U.S.C. 154(b) by 2 days.

(21) Appl. No.: 10/451,434

(22) PCT Filed: Jan. 21, 2002

(86) PCT No.: PCT/FI02/00046

§ 371 (c)(1),
(2), (4) Date: Oct. 1, 2003

(87) PCT Pub. No.: WO02/058080

PCT Pub. Date: Jul. 25, 2002

(65) Prior Publication Data

US 2004/0099211 A1    May 27, 2004

(30) Foreign Application Priority Data

Jan. 22, 2001    (FI) .................................. 20010128

(51) Int. Cl.
- *B32B 5/14* (2006.01)
- *B32B 27/10* (2006.01)
- *B32B 37/14* (2006.01)
- *B32B 38/14* (2006.01)

(52) U.S. Cl. ................... 428/172; 428/211; 428/537.5; 428/901; 428/913; 427/391; 427/427.4

(58) Field of Classification Search ................ 252/500; 428/195, 211, 411.1, 537.5, 901, 913, 172; 427/391, 427.4
See application file for complete search history.

(56) References Cited

U.S. PATENT DOCUMENTS 4,638,286 A    1/1987    Nichols ........................ 338/34

(Continued)

FOREIGN PATENT DOCUMENTS

EP    1 047 033 A1    10/2000

(Continued)

OTHER PUBLICATIONS

Encyclopedia of Polymer Science and Engineering, vol. 3: Coating Methods, p. 552, Nov. 1985.*

*Primary Examiner*—Ramsey Zacharia
(74) *Attorney, Agent, or Firm*—Oliff & Berridge, PLC

(57) ABSTRACT

The invention concerns a layered structure comprising at least two material layers. The layered structure is formed of a conductive polymer on a substrate material layer to allow a reaction in the conductive polymer material when the layered structure is exposed to the surrounding conditions. The invention also concerns a method for producing layered structure. In the method the conductive polymer material is applied on the substrate material by printing or spraying or stamping or casting or spin coating or by using photolithographic or laser ablation method or a combination of these. The invention further concerns a sensor comprising an electric device short circuited by the conductive polymer of the layered structure. In the sensor a change in the conductive polymer initiates a change in the function of the electric device.

16 Claims, 3 Drawing Sheets

U.S. PATENT DOCUMENTS

| | | | |
|---|---|---|---|
| 4,646,066 A * | 2/1987 | Baughman et al. | 340/540 |
| 4,900,405 A | 2/1990 | Otagawa et al. | 205/781 |
| 5,310,507 A | 5/1994 | Zakin et al. | 252/500 |
| 5,512,882 A | 4/1996 | Stetter et al. | 340/632 |
| 5,622,652 A | 4/1997 | Kucherovsky et al. | 252/511 |
| 5,656,081 A | 8/1997 | Isen et al. | 118/46 |
| 5,783,111 A | 7/1998 | Ikkala et al. | 252/500 |
| 6,137,669 A | 10/2000 | Chiang et al. | 361/103 |

FOREIGN PATENT DOCUMENTS

| | | |
|---|---|---|
| WO | WO 99/00565 | 1/1999 |

* cited by examiner

LAYERED STRUCTURE, SENSOR AND METHOD OF PRODUCING AND USE OF THE SAME

BACKGROUND

The present invention relates to a layered structure comprising at least two material layers, a sensor, a method for producing layered structure and its use.

Conductive polymers are materials which have been made conductive by doping with suitable substance. In the doping process both electron acceptors and donors react with polymer structure resulting in highly conducting derivatives. These reactions are called 'doping' in analogy to semiconductors, though they are closer to solid-state chemical reactions. Another method for generating electrical conductivity in polymers is blending in which conductive polymer and insulating material are mixed. Electrical properties of conductive polymers can be changed over the fall range of conductivity from insulators to metallic conductors. An example of a conductive polymer is polyaniline which is a synthetic organic polymer obtained by the chemical or electrochemical oxidative polymerization of aniline. Emeraldine base, which is the most stable insulating form of polyaniline, can be made conducting either by oxidation or by expose of functional protonic acids e.g. HCl or $H_2SO_4$. Correspondingly, the conducting emeraldine can be made less conducting or even insulating by a dedoping reaction caused by a reduction process or by exposure to alkaline materials. There are wide prospects of using conductive polymers in variety of consumer products. Examples of known use of conductive polymers are batteries, electrical circuits, capacitors, EMI shields, organic LEDs, corrosion prevention products and antistatic products for use in e.g. package industry, construction, clothes, automotive industry, mining.

Conductive polymers, materials and products are known in the art from many patent publications of which some of them are disclosed in the following.

U.S. Pat. No. 5,783,111 discloses compositions comprising electrically conducting polyaniline and particular substituted aromatic compounds that simultaneously form hydrogen bonds and ring-ring interactions with, respectively, the NH-groups and the six-membered rings of the conducting polyanilines. The conducting polyaniline compositions show drastically enhanced processibility and their blends with insulating or semiconducting materials exhibit significantly improved electrical properties.

U.S. Pat. No. 5,656,081 discloses a press for printing an electrical circuit component directly on a substrate with an electrically conductive liquid. A method of making such a press includes the steps of providing a press surface and engraving the press surface with the plurality of liquid carrying cells which are in liquid communication with each other in both the printing direction and in the transverse direction.

U.S. Pat. No. 5,622,652 discloses electrically conductive liquid for directly printing an electrical circuit component onto a substrate and a method for making such a liquid. The invention relates to an electrically conductive liquid which, when printed onto a substrate is capable of carrying out an electrical circuit function. Using the method there is no need for post-printing steps such as metal etching, catalytic ink activation or electroless deposition.

SUMMARY

The object of the present invention is to provide a novel layered structure comprising active substrate and conductive polymer material.

Another object of the present invention is to provide a method for producing the layered structure comprising active substrate and conductive polymer material.

A further object of the present invention is to provide a sensor comprising layered structure according to the invention.

In view of achieving of the objectives stated above the layered structure according to the invention is mainly characterized in that the layered structure is formed of a conductive polymer on a substrate material layer to allow a reaction in the conductive polymer material when the layered structure is exposed to the surrounding conditions.

The method for producing layered structure is characterized by applying the conductive polymer material on the substrate material by printing or spraying or stamping or casting or spin coating or by using photolithographic or laser ablation method or a combination of these.

The sensor according to the invention comprising an electric device short circuited by the conductive polymer of the layered structure is characterized in that a change in the conductive polymer initiates a change in the function of the electric device.

The layered structure according to the invention, comprising at least two material layers, is formed of a conducting polymer on a substrate material layer and said substrate material has the property of catalysing changes in the conductive polymer when the layered structure experiences a change in its surrounding environment. Further, said substrate material causes a dedoping reaction in the conductive polymer.

In the layered structure according to the invention the substrate material allows a reaction in a conductive polymer, such as polyaniline, and the conductivity and/or optical property and/or color of the conductive polymer changes when the layered structure becomes exposed to the surrounding conditions, e.g. to open air or humidity. The parameters affecting the reaction are e.g. substrate material properties, such as acidity, porosity and thickness, as well as surrounding conditions, such as humidity, UV radiation and temperature, and also properties of the layered structure such as coating. By adjusting the surface or contact between the substrate material and conductive polymer it is possible to affect the rate of the reaction. Coating and coating methods also affect the reaction. This phenomenon found in the layered structure according to the invention can be utilized in various ways. In the layered structure the substrate material is paper or material with at least one component of paper or other substrate material with suitable properties.

Geometrical properties of the polymer layer in the layered structure also affect the rate of the reaction and thus the time dependent behaviour of the conductivity of the conductive polymer. The thinner the conductive polymer layer the faster the conductivity decreases when exposed to the surrounding conditions. By adjusting the horizontal and vertical dimensions of the conductive polymer layer it is possible to choose the time scale during which the desired reaction occurs. This phenomenon has been demonstrated in FIG. 5.

Manufacturing methods for the layered structure in which conductive polymer material is added on substrate surface according to the invention are e.g. the conventional methods for manufacturing of electrical circuits, such as photolithography, spin coating, spraying, laser ablation, and casting as well as printing methods such as gravure, flexographic, offset, digital, or silk screen printing method or a combination of these. Layered structure according to the invention can also be made using lamination, stamping, coating and vacuum coating techniques.

Utilizing the present invention makes it possible to produce inexpensive indicator components printed on substrate material. These components can be widely used for example in consumer products. The elasticity of the layered structure gives it flexural strength which allows its use in applications in which the layered structure may be bent. One of the main advantages of the present invention is that the phenomenon occurring in the layered structure is detectable visually as well as instrumentally.

Examples of the use of the components according to the invention are the following:
- sensor material which indicates a charge in a state of a package
- sensor material which indicates a change in a content of a package
- a sensor indicating conductivity change for example when a package has been broken
- entertaining applications in which a figure appears or disappears when a package has been opened

BRIEF DESCRIPTION OF THE DRAWINGS

In the following the invention will be described in detail with reference of the figures in the accompanying drawing.

DETAILED DESCRIPTION OF EMBODIMENTS

Figure 1A:
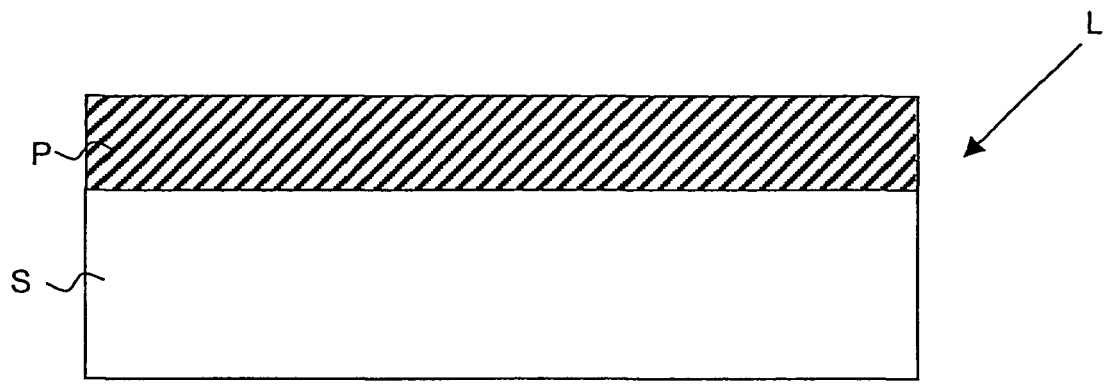
FIG. 1A shows an example of a layered structure according to the invention.

FIG. 1A shows an example of a layered structure according to the invention. The layered structure L comprises a substrate layer S and a conductive polymer layer P. The substrate layer S is paper or other fiber based material or a substrate material with suitable properties according to the invention.

Optionally, an intermediate layer is generated between the substrate layer S and conductive polymer layer P. This intermediate layer adjusts the reaction rate in the conductive polymer layer P by enabling or disabling the passage of the environment factors to the layered structure L. The intermediate layer may also be an integral part of the substrate layer S.

Figure 1B:
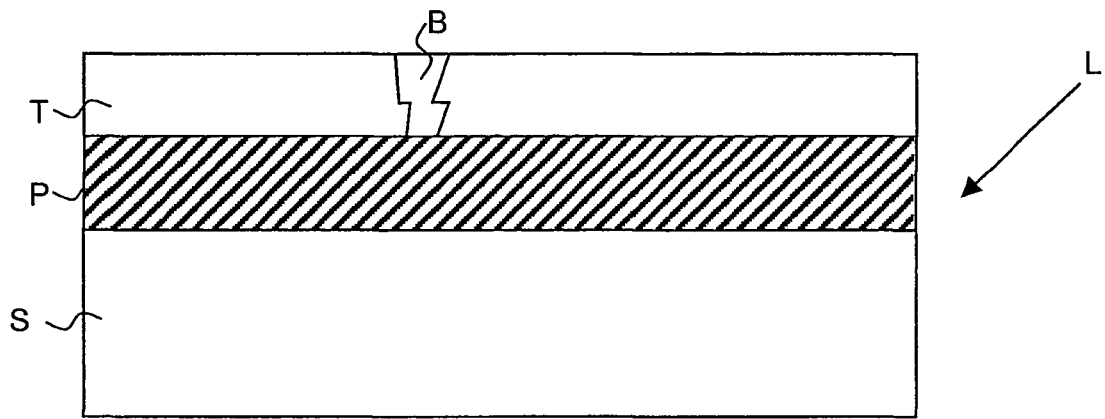
FIG. 1B shows a layered structure with a coating layer.

FIG. 1B shows a layered structure with a coating layer T. In the coating layer T there is shown a breakage B through which the layered structure is exposed to the surrounding conditions. In the area of the breakage B the resistance of the conductive polymer layer P starts increasing. This change in resistance can be measured using conventional measurement devices and also the change in colour of the conductive polymer can be detected visually. Even through the example of FIG. 1B shows the coating layer T on top of the conductive polymer layer P, it is to be understood that the coating layer T can alternatively be on top of the substrate layer S or on both sides of the layered structure L.

Figure 2:
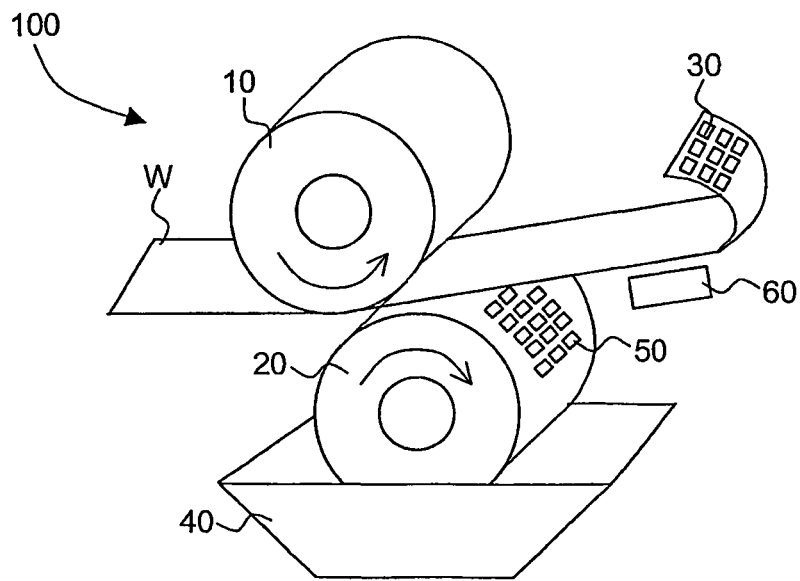
FIG. 2 shows a printing system for producing the layered structures.

FIG. 2 shows an example of a printing system in which the layered structure according to the invention is produced. The web W of substrate material enters the printing unit 100 which comprises an impression cylinder 10, a printing cylinder 20 and a container 40. The surface of the printing cylinder 20 is provided with printing elements 50. The ink container 40 contains conductive polymer material liquid which is passed via the printing elements 50 on the web W to form layered structures 30 according to the invention. The printing system comprising a printing cylinder may be a gravure printing system, flexographic printing system, an offset printing system, or an electrographic printing system. Also other printing methods can be applied according to the invention, e.g. digital or silk screen printing method or stamping as well as spraying and casting methods.

By using printing systems for manufacturing layered structures according to the invention it is possible to create structures comprising conductive polymers of any desired dimensions and variable thickness.

The printing system 100 may also contain a curing unit 60 which cures the web W by e.g. thermal curing or UV curing or other known curing method. The curing unit 60 may be placed on either side of the web or on both sides.

Figure 3A:
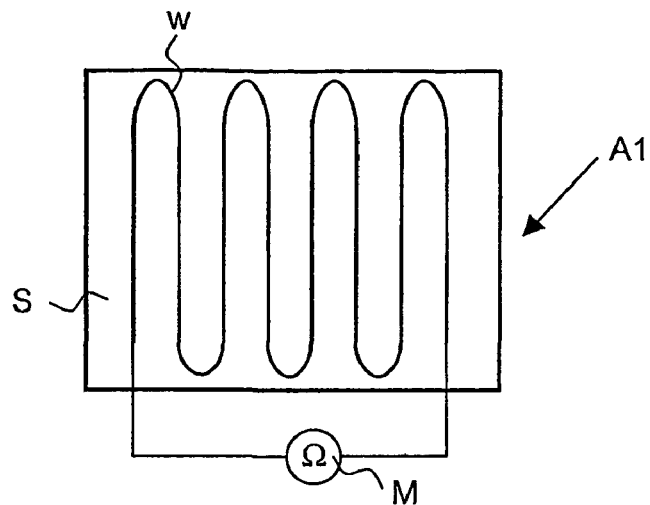
FIG. 3A shows an application of the layered structure according to the invention.

FIG. 3A shows another application of the layered structure according to the invention. In this layered structure application A1 wire w forms a continuous pattern packed in small area. The change in resistance of the wire w catalysed by the substrate S is measured using the measuring equipment M and information of the change of resistance is achieved.

Figure 3B:
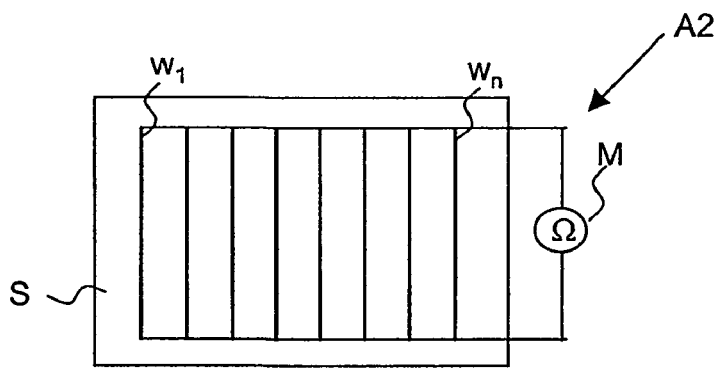
FIG. 3B shows another application of the layered structure according to the invention.

FIG. 3B shows an application of the layered structure according to the invention. In this application A2 wires $w_1, \ldots, w_n$ composed of the conductive polymer are printed on the substrate layer S and they are electrically connected in parallel. The total resistance of the parallel connection of the wires $w_1, \ldots, w_n$ is measured using the measuring equipment M which is e.g. a typical resistance meter. When the layered structure L is exposed to the surrounding conditions the resistance of the wires $w_1, \ldots, w_n$ changes and this change gives information of how long the exposure has taken place.

Figure 3C:
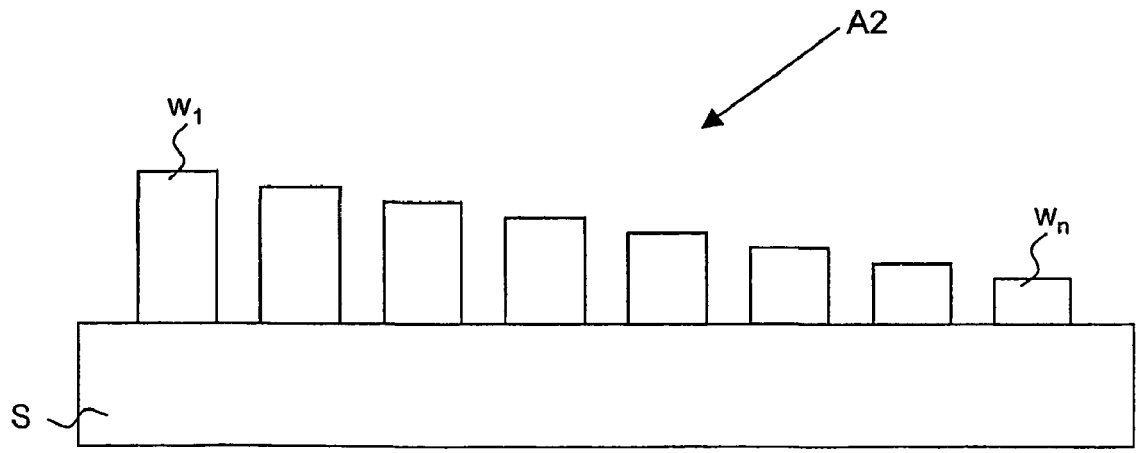
FIG. 3C shows a cross-cutting of the layered structure application.

FIG. 3C shows a magnified cross-cutting of the layered structure application A2. FIG. 3C shows the vertical variance in thickness of wires $w_1, \ldots, w_n$. The first wire $w_1$ possesses the greatest vertical thickness and therefore the reaction causing the change of conductivity in the layered structure according to the invention occurs slowest. In the less thick wires $w_2, \ldots, w_n$ the reaction is faster and depends in each wire on the vertical amount of the conductive polymer in the wires. Therefore the total resistance increases gradually in a non-linear or step-wise manner and the total time elapsed from the exposure of the layered structure application to the surrounding conditions can be estimated in fairly good accuracy. The change in resistance of the wires $w_1, \ldots, w_n$ is also detectable visually by the change of the colour of the wires.

By varying the thickness and/or width of the wires $w_1, \ldots, w_n$ the reaction rate can be adjusted in a desired way.

This way the time scale in which the reaction occurs can be chosen depending the purpose or use of the layered structure application A2.

Figure 4A:
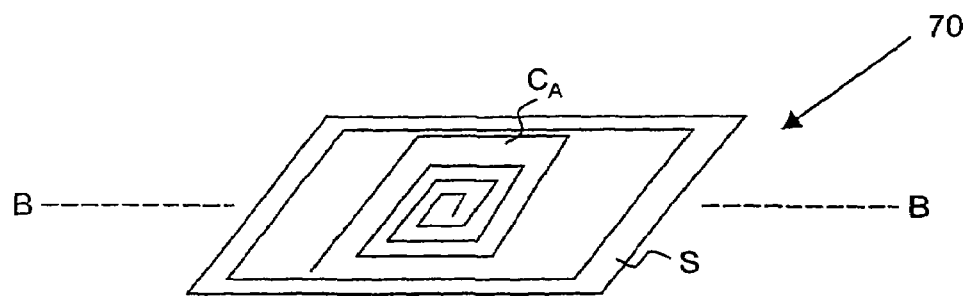
FIG. 4A shows an example of a sensor according to the invention.
Figure 4B:
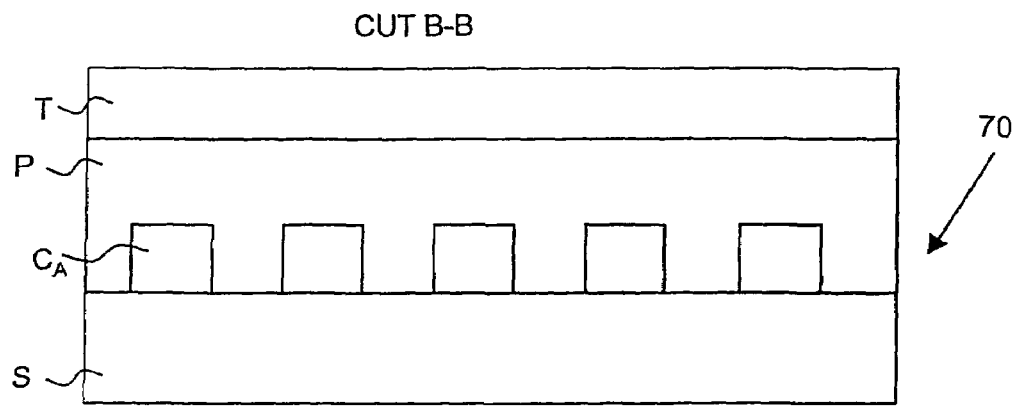
FIG. 4B shows a cross cutting of the sensor according to the invention.

FIG. 4A shows an example of a sensor according to the invention and FIG. 4B shows a cross cutting of the sensor. The sensor 70 comprises an electric device which in this example is a conventional RF tag $C_A$ printed or manufactured on the substrate material S using any known method. This type of an RF tag may act as an alarm means in a package. The RF tag $C_A$ comprises a conductive polymer layer P which, with the substrate layer S, forms a layered structure according to the invention. The conductive polymer layer P is covered with the coating layer T. As long as the conductive polymer layer P is intact, it is in conductive state and the RF tag $C_A$ is short circuited. Once the layered structure becomes exposed to the surrounding conditions through a breakage conductive polymer P loses its conductivity due to the reaction characteristic for the layered structure according to the invention. This causes the RF tag $C_A$ turning into an RF circuit which is readable with any known RF tag indicating method. The signal given by the RF circuit indicates the breakage of the package.

When the RF tag $C_A$ is attached on a package the condition of the package can be monitored in any state of e.g. the transport chain or storage. The monitoring gives information of the breakage of the package or unauthorised opening of the package depending the positioning of the sensor on the package surface.

Other applications of the invention are e.g. use as sensor material which indicates a change in a content of a package, such as contamination. Also entertaining applications in which a figure appears or disappears when a package has been opened can be accomplished using the invention.

Trial runs have been made in a pilot printing machine with the method according to the invention and promising results have been achieved. A gravure cylinder was manufactured for the trial runs. The gravure cylinder contained line and pattern structures of various dimensions. The cell depths of the gravure cylinder were 22 µm, 33 µm, 45 µm, 80/85 µm and 140/160 µm. The achieved line widths of the conductive polymer varied from 60 µm to 1 mm and the thickness of the conductive polymer varied from 0.1 to 10 µm. The machine speed of the pilot printing machine in the trial runs was up to 100 m/min.

The gravure cylinder was used in the printing machine and three different conductive polymer materials were used in printing on polyester film with external chemical treatment and on a paper. The ink materials were polytiophene in a form of PEDT/PSS dispersion, SOL-GEL PEDOT liquid and polyaniline based PANI/DBSA toluene. In the trial runs paper and polyester film proved to be a suitable substrate material for conductive polymer components. All tested conductive polymer materials were found to be suitable for printing in the test printing machine.

The behaviour of the printed structures was followed for some time in the printed material. It was found out that the conductivity of the printed polyaniline patterns was changed in time and at the same time the colour of the printed patterns was changing. When the substrate material was paper the color and the conductivity were changing. When the substrate material was a polyester film only a minor change was detected during the followed period.

Figure 5:
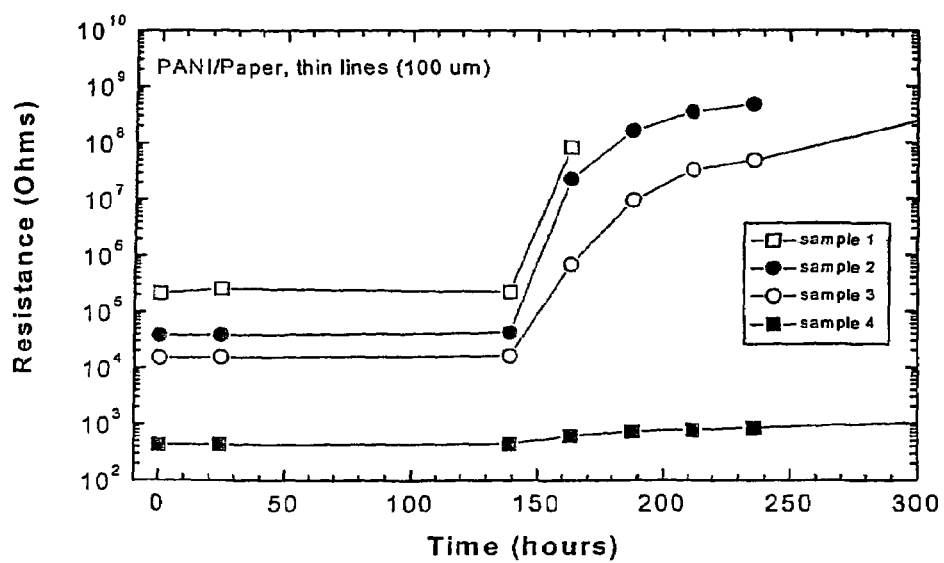
FIG. 5 shows an example of measured values of the change in resistance in the patterns formed of the layered structure according to the invention.

FIG. 5 shows the measured change in resistance in the layered structure according to the invention. Four samples of polyaniline printed on paper were followed for 250 hours. The thickness of the samples varied so that the sample 1 in FIG. 5 was thinnest and the sample 4 was thickest. The samples were kept in the plastic bag for the first 139 hours and then they were left in open air. In the sample 4 with the thickest layer of polyaniline the reaction occurred slowest and no big change is seen. In the samples 1, 2, 3 with thinner layer of polyaniline the reaction was faster depending on the layer thickness. Curves in FIG. 5 show clearly the change in resistance when the samples are moved to open air.

In the following the patent claims will be given and various details of the invention may show variation within the scope of the invented idea defined in the patent claims and differ from the details disclosed above for the sake of example only.

What is claimed is:

1. A layered structure, comprising:
   at least two material layers defining the layered structure, said layered structure being formed of a conductive polymer material layer on a substrate material layer, wherein:
   the substrate material layer is paper, the conductive polymer material layer has been printed or coated on the substrate material layer, said substrate material layer has a property of catalyzing a dedoping reaction in the conductive polymer material layer when the layered structure experiences at least one of open air, a change in humidity, and UV radiation, and horizontal and vertical dimensions of the conductive polymer material layer varies in different parts of the conductive polymer material layer.

2. The layered structure according to claim 1, wherein the conductive polymer material layer is polyaniline.

3. The layered structure according to claim 1, wherein the layered structure comprises an intermediate layer between the substrate material layer and the conductive polymer material layer.

4. The layered structure according to claim 1, wherein a reaction causing a change in the layered structure is detectable in a change of a conductivity of the conductive polymer material layer.

5. The layered structure according to claim 1, wherein a reaction causing a change in the layered structure is detectable visually in a change of the conductive polymer material layer.

6. The layered structure according to claim 1, wherein a reaction causing a change in the layered structure is detectable optically.

7. The layered structure according to claim 1, wherein the conductive polymer material layer forms an electric circuit on the substrate material layer.

8. A method of producing the layered structure according to claim 1, comprising:
   applying the conductive polymer material layer on the substrate material layer by one of printing, spraying, stamping, casting, spin coating, by using photolithographic method and a laser ablation method.

9. The method according to claim 8, further comprising:
   printing the conductive polymer material layer on the substrate material layer by a printing system including a method of at least one of gravure, flexographic, offset, digital, and silk screen printing.

10. Electric circuits manufactured according to the method of claim 8, wherein the electric circuits act as indicators.

11. Sensors manufactured according to the method of claim 8.

12. Entertaining products manufactured according to the method of claim 8.

13. A sensor, comprising:
an electric device short circuited by the conductive polymer material layer of the layered structure according to claim 1, wherein a change in the conductivity of the conductive polymer material layer initiates a change in a function of the electric device.

14. The sensor according to claim 13, wherein the conductive polymer material layer of the layered structure loses a conductivity when exposed to surrounding conditions, and activates the electric device.

15. The sensor according to claim 13, wherein the electric device is an RF tag.

16. The sensor according to claim 13, wherein the RF tag is wirelessly readable.

* * * * *